March 9, 1926. 1,575,946
M. S. SULLIVAN
POWER CULTIVATOR
Filed Feb. 9, 1925 4 Sheets-Sheet 1
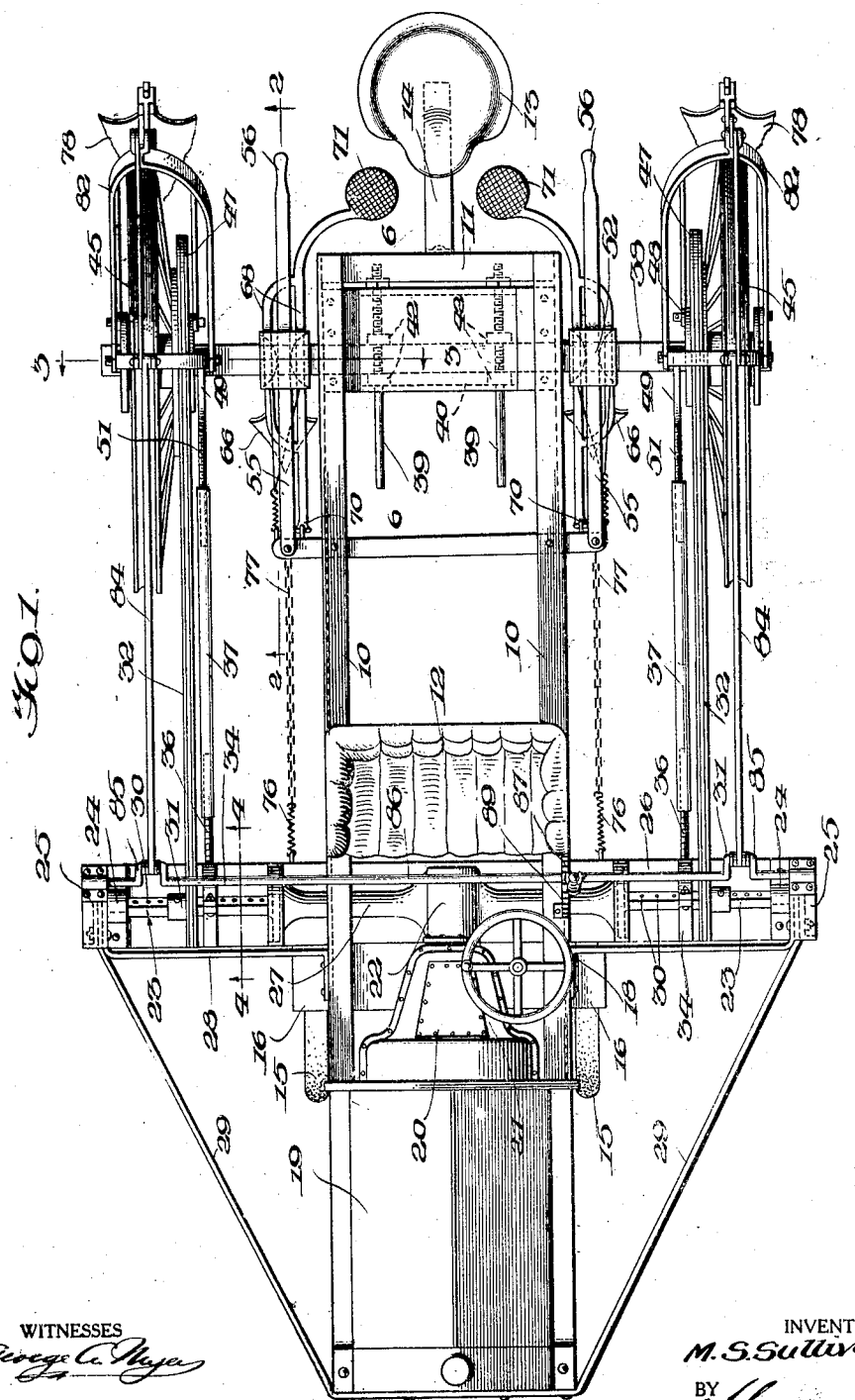
WITNESSES
INVENTOR
M. S. Sullivan,
BY
ATTORNEYS

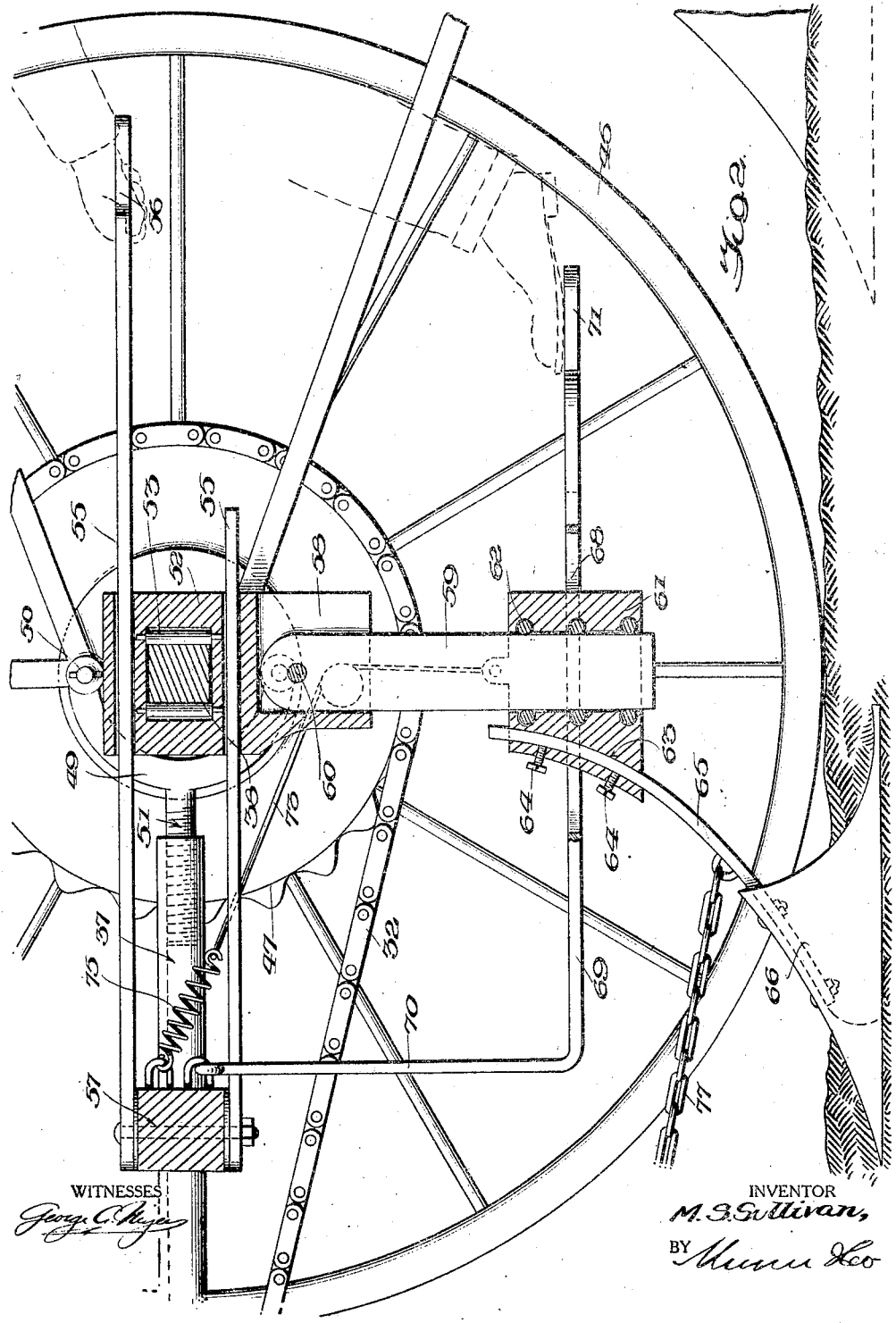

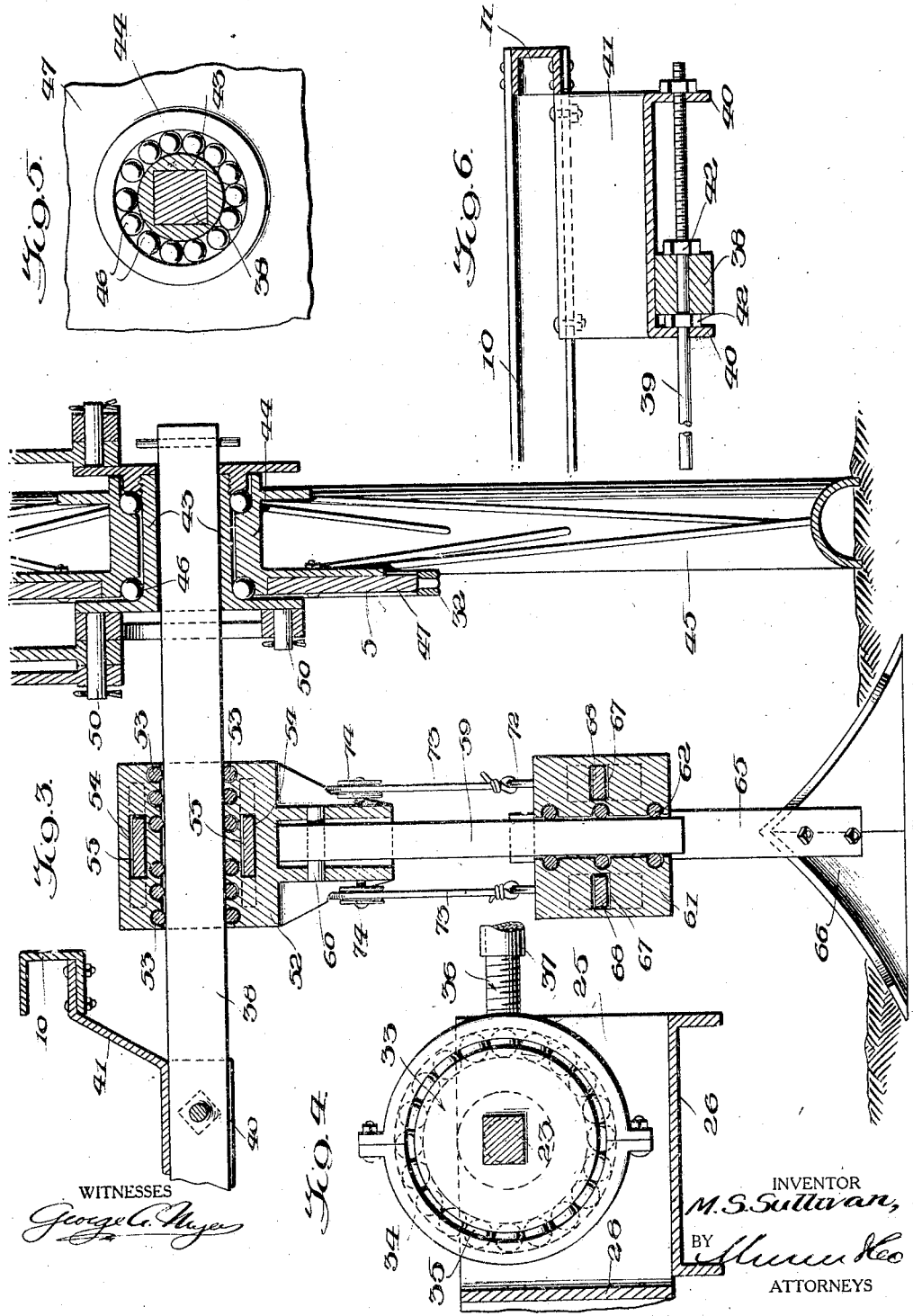

March 9, 1926.
M. S. SULLIVAN
POWER CULTIVATOR
Filed Feb. 9, 1925
1,575,946
4 Sheets-Sheet 4
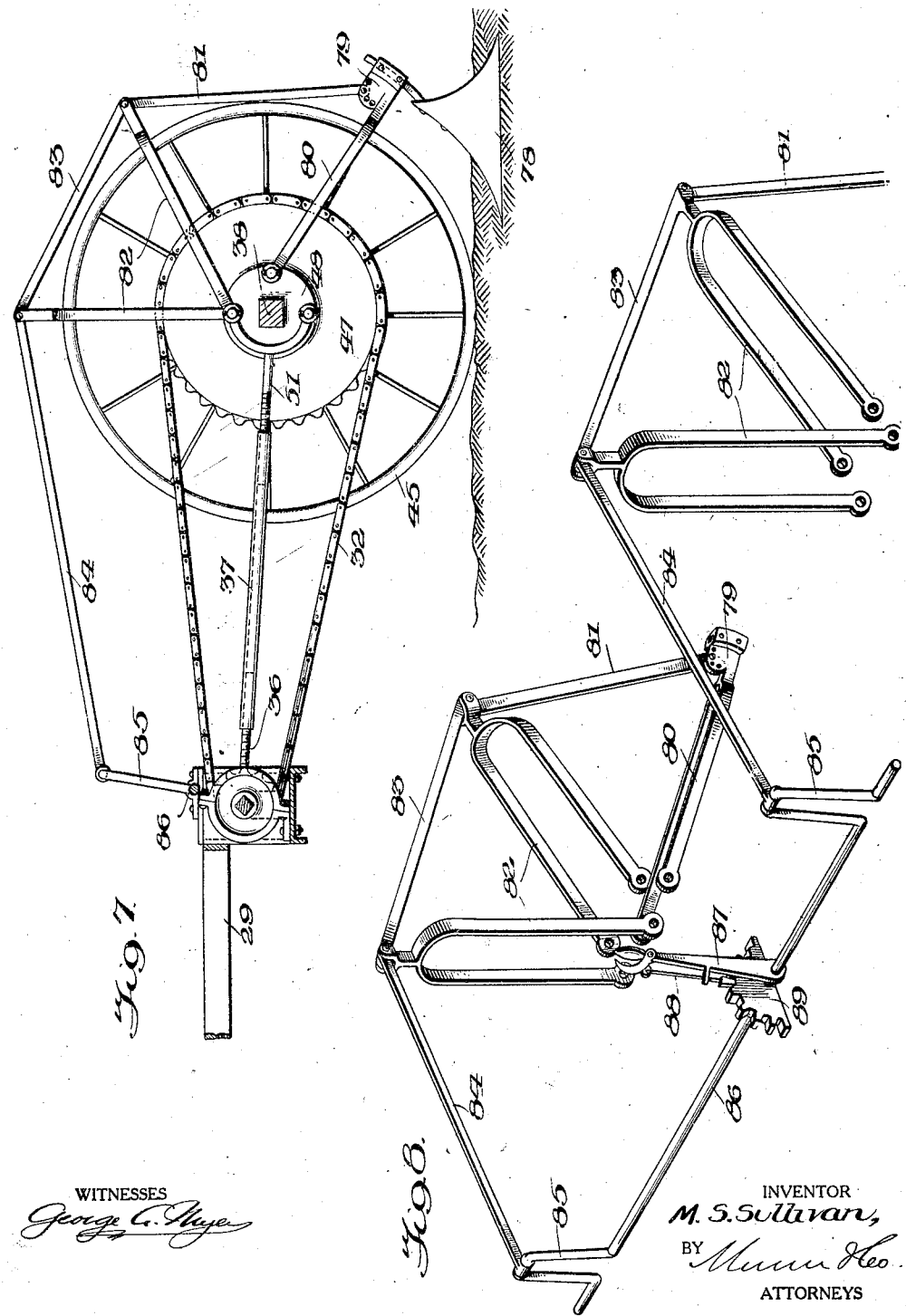

Patented Mar. 9, 1926.

1,575,946

UNITED STATES PATENT OFFICE.

MANLEY S. SULLIVAN, OF CHARLESTON, SOUTH CAROLINA.

POWER CULTIVATOR.

Application filed February 9, 1925. Serial No. 8,051.

*To all whom it may concern:*

Be it known that I, MANLEY S. SULLIVAN, a citizen of the United States, and a resident of Charleston, in the county of Charleston and State of South Carolina, have invented certain new and useful Improvements in Power Cultivators, of which the following is a specification.

My present invention relates generally to cultivating machines, and more particularly to a power cultivator of the two-man type, that is, a machine for cultivating the ground in connection with which two operators are employed, one to guide the machine and manipulate the power actuating parts, and the other to actuate, control and adjust the ground engaging cultivating implements.

The primary object of my invention is the provision of a machine of the above type wherein the control and adjustment of the cultivating implements may be easily and effectively accomplished in order that the machine may efficiently operate where the planted crops vary in line as well as in distance between rows, and a further object is the provision of a machine which will be strong and durable, and wherein adjustments for wear as well as the substitution of parts is made easy.

Still further objects as well as resulting advantages of my improved machine will be apparent from the following description, reference being made to the accompanying drawings, forming a part of this specification, and wherein Figure 1 is a top plan view of the complete machine, Figure 2 is a partial vertical longitudinal section taken substantially on the line 2—2 of Figure 1, Figure 3 is a partial vertical transverse section taken substantially on the line 3—3 of Figure 1, Figure 4 is a detail vertical section taken on the line 4—4 of Figure 1, Figure 5 is a detail vertical section taken on the line 5—5 of Figure 3, and Figure 6 is another detail vertical section taken substantially on the line 6—6 of Figure 1.

Figure 7 is a partial vertical longitudinal section illustrating one of the outside plows, and, Figure 8 is a detail perspective view of the adjusting connections for the outside plows.

Referring now to these figures, and particularly to Figure 1, my improved machine embodies an elongated rectangular frame of which the side bars are indicated at 10, and the rear transverse bar at 11, and my invention proposes operators' seats 12 and 13, the former extending across the frame about midway between the ends thereof for the operator controlling the direction of movement of the machine and the power actuation thereon, and the latter mounted upon a seat bar 14 extending rearwardly from the rear transverse frame bar 11 for the operator who controls the ground engaging cultivating implements.

The front wheels 15 are mounted in connection with a front truck 16 below the forward portion of the main frame, controlled by suitable steering connections indicated at 17 and including a steering wheel 18 adjacent the driver's seat 12. The forward portion of the main frame also supports a motor, in the present showing, concealed beneath a hood 19, which may be the motor of a well known type of automobile in connection with a transmission 20 for instance from the same type of automobile, adjacent to which control pedals 21 are shown.

A short propeller shaft is used connecting the transmission 20 with the differential 22 forming part of a rear axle housing from the same type of automobile which in the present instance, is mounted transversely of the main frame and slightly below the same immediately in front of the driver's seat 12, the ends of the rear axles being provided with laterally outstanding squared extensions 23 whose outer ends are suitably mounted in bearings 24.

The bearings 24 are secured adjacent to the outer upturned ends 25 of a cross beam 26 extending beneath and across and secured to the frame side bars 10 and preferably of the channel form shown. This beam which affords an effective support for the rear axle assembly generally indicated at 27 and utilized along with its squared extensions 23 as a transverse transmission shaft in the present instance, is suitably braced as by means of brace bars 28 outstanding from the frame bars 10 and secured at their outer ends to the upstanding ends 25 of the beam 26, as well as by a U-shaped brace frame 29, the central portion of which is securely fastened across the front of the main frame, with its extensions diverging rearwardly and secured at their rear ends to the outer upstanding ends 25 of the beam.

The axle extensions 23 are preferably provided with lengthwise series of apertures 30 and have thereon sprocket wheels 31 which may be held by pins through selected apertures 30 and around which are extended the forward ends of side sprocket chains 32. Inwardly beyond the sprocket wheels 31, the axle extensions 23 are provided with disks 33 rotatable within sectional rings 34 as best seen in Figure 4 by virtue of interposed anti-friction balls 35, each ring 34 having one of its sections provided with a rearwardly projecting threaded stem 36 extending within one end of a tubular connecting bar 37 for a purpose which will be presently described.

The rear axle 38 is likewise squared and extends across and beneath the rear portion of the main frame as plainly seen in Figures 1 and 3, and is in one piece. Adjacent to its center this rear axle is apertured for the reception of a pair of laterally spaced lengthwise disposed adjusting bars 39 mounted through the forward and rear depending flanges 40 of an axle supporting apron 41 transversely of the main frame with its ends securely fastened to the frame side bars 10 adjacent to the rear ends of the latter in the manner most plainly seen in Figure 3. These bars 39 are threaded for the reception of nuts 42 adapted to abut the front and rear faces of the axle 38 so that the latter is thus adjustable forwardly and rearwardly between the apron flanges 40.

The outer ends of the axle 38 are provided with sleeves 43 upon which the hubs 44 of the rear wheels 45 are rotatably disposed with interposed anti-friction bearings 46, each wheel having secured against its inner face and around its hub portion 4 a sprocket wheel 47 which receives the rear end of one of the sprocket chains 32 above mentioned. Each wheel supporting sleeve 43 having of course an outer cylindrical surface and a squared inner surface, is provided at its inner end with an annular flange 48 to which rear U-shaped yokes 49 are pinned, the pins 50 projecting laterally from the flange 48 and through openings of the yokes, the latter of which have forwardly projecting threaded stems 51 entering the rear ends of the tubular connecting bars 37 so that the latter with the stems 36 and 51 thus form rigid lengthwise braces between the axle extensions 23 and the outwardly projecting ends of the rear axle 28, and at the same time braces capable of ready adjustment to coincide with the adjustment of the rear axle 38 rearwardly in order that the driving chains may be maintained at the proper tension at all times.

Slidable on the rear axle 38 in the spaces between the side bars 10 of the main frame and the yokes 49, are a pair of cultivator supporting brackets 52, each bracket preferably having upper and lower series of anti-friction balls 53 in engagement with the axle so that sliding movement of the brackets is greatly facilitated. Each bracket has slotted openings 54 above and below the axle, these openings being flared at their forward and rear ends and receiving therethrough controlling arms 55 of which the upper arm of each pair is extended rearwardly and provided with a handle 56 at one side of the control operator's seat 13, adapted to be grasped by the operator's hand. The forward ends of the control arms 55 are pivotally connected to the ends of a supporting bar 57 secured beneath and across the side bars 10 of the main frame forwardly of the rear axle 38, and it is thus obvious that the positions of the brackets 52 on those portions of the rear axle upon which these brackets are laterally adjustable toward and away from one another, as well as the adjustment of the brackets to new positions, is under the immediate control of the hands of the control operator through the handles 56 of the adjusting arms 55.

Each of the brackets 52 has a lower rearwardly opening socket 58, and in each of these sockets the upper end of a cultivator bar 59 is mounted upon a transverse pivot 60 which permits the bar to swing rearwardly but prevents the same from swinging laterally with respect to the bracket, the forward portion of the latter preventing forwardly swinging movement of the cultivator bar beyond the vertical. It is to be understood of course that the cultivator bars 59 are shiftable laterally with the brackets 52 and it is plain from Figures 2 and 3 that these bars form supports for vertically adjustable cultivator heads 61 having internal anti-friction members 62 engaging the surfaces of the bars 59 so as to facilitate vertical adjustment of the heads, the latter of which have slots 63 at their forward portions and set screws 64, respectively for the reception and connection of the upwardly and rearwardly curved stems 65 of the cultivator implements 66.

The heads 61 are also provided at opposite sides of the cultivator bars 59 with slots 67 whose forward and rear portions are flared, receiving the side portions 68 of adjusting foot bars 69 whose forward upturned ends 70 are pivotally connected to their transverse beam 57 so that the bars 69 can swing laterally, and whose rear ends are provided with pedals 71 for the operator's feet.

Furthermore, the heads 61 are provided at opposite sides with upstanding eyes 72 to which the lower ends of flexible connections 73 are secured. These connections 73 pass forwardly around guide rollers 74 mounted upon the lower side portions of the brackets 52, and have their upper forward ends connected by virtue of coil springs 75 with the supporting beam 57 as plainly seen in Figure 2. The tension of the springs 55 is such as to draw the heads 61 upwardly on the cultivator bars 59 at all times except where the pressure of the operator's feet on the pedals 71 is sufficient to hold the heads 61 and consequently the cultivator implements 66 downwardly to the desired point.

At any time when it is desired that the cultivator implements be elevated all that it is necessary for the operator to do is to relieve the above mentioned pressure upon the pedals 71 and the springs 75 will immediately respond to draw the heads and consequently the cultivator implements upwardly on the bars 59. Where however, the cultivator implements strike stumps or stones unseen by the operator, or where other unknown obstructions of a rigid nature are encountered, it is obvious that the implements may yield rearwardly by virtue of the upper pivots 60 of the cultivator bars 59 permitting these bars to swing rearwardly. Such rearward yielding movement is however against the tension of springs 76, as shown in Figure 1, connected at their forward ends to the forward transverse beam 26, and connected at their rear ends to the forward ends of chains 77. These chains extend rearwardly and downwardly and have their rear ends as shown in Figure 2 connected to the stems 65 of the cultivator implements 66.

Thus it is obvious that in order to control the lateral spacing of the cultivator implements, all that it is necessary for the control operator to do is to shift the adjusting arms 56 toward or away from one another, and in order to control the elevation at the cultivator implements 66, all that it is necessary for the operator to do is to press more or less upon the pedals 71. In this way it is both easy and convenient for the operator to effect the controls, seated upon the operator's seat 13, and in view of the particular construction of the parts involved in the adjustment of the cultivator implements in the foregoing manner, as well as in the machine as a whole, it is obvious that my invention will be strong, durable and is at the same time simple and comparatively inexpensive, and it is furthermore obvious that the construction that I employ provides not only for ready repair of parts which have become broken, but also for the ready substitution of new parts in case of wear or breakage.

I may, however, utilize, in addition to the plows or cultivating implements 66, other outside plowing and cultivating implements 78 located immediately in the rear of, and following, the rear wheels 45 as best seen in Figs. 1 and 7. These outside implements are particularly useful in working cabbages, potatoes and other plants in narrow rows, as it will enable the operator to work four rows at a time. These implements may however be elevated above the ground when not in use, and for this reason the shanks or stems are supported in brackets 79 at the rear lower ends of supporting arms 80 pivotally mounted at their upper forward ends on the flanges 48 before described.

The brackets 79 are moreover connected loosely and adjustably to the lower ends of suspension members 81 as seen in Figure 7 and these suspension members are in turn pivotally connected to adjusting arms 82 straddling the upper portions of the rear wheels with connecting links 83 between them. The forward adjusting arms 82 are movably connected by rods 84 to the upstanding side cranks 85 of an adjusting shaft 86 journaled across the main frame forwardly of the driver's seat. Shaft 86 as most plainly shown in Figure 8 has an approximately central upper control lever 87 provided with a latch mechanism 88 engaging a stationary tooth quadrant 89 and is located within easy convenient reach of the driver of the machine.

In view of the lack of provision of means to permit of rearward and upward yielding of the outside implements as is the case with the implements 66, these outside implements will, in practice preferably take the form of disc cultivators or spring tooth plows and cultivators. As these implements are manipulated into and out of active position by the driver no additional burden is thrown upon the operator controlling plows 66.

I claim:—

1. A cultivator of the type described including a frame, a rear axle, wheels on the axle spaced from the frame sides, brackets slidably mounted on the axle between the frame and wheels, hand controlled means to shift the brackets on the axle, cultivator bars depending from the brackets, cultivator implements, and heads to which the implements are attached, adjustably mounted for vertical movement on the said cultivator bars.

2. A cultivator of the type described including a frame, a rear axle, wheels on the axle spaced from the frame sides, brackets slidably mounted on the axle between the frame and wheels, hand controlled means to shift the brackets on the axle, cultivator bars depending from the brackets, cultivator implements, and heads to which the implements are attached, adjustably mounted for vertical movement on the said cultivator bars, said cultivator bars being pivotally connected at their upper ends to the brackets for rearward swinging movement, and means to yieldingly hold the cultivator bars in a normal pendent position.

3. A cultivator of the type described including a wheeled frame, a rear axle on which the wheels at the rear of the frame are mounted, brackets slidable toward and away from one another arranged in spaced apart relation on the axle, cultivator bars pendent from said brackets, cultivator implements, heads in connection with which said implements are mounted movable vertically on the cultivator bars, manually actuated means for shifting the said brackets, and manually actuated means for controlling the position of said heads on the bars.

4. A cultivator of the type described including a wheeled frame, a rear axle on which the wheels at the rear of the frame are mounted, brackets slidable toward and away from one another arranged in spaced apart relation on the axle, cultivator bars pendent from said brackets, cultivator implements, heads in connection with which said implements are mounted movable vertically on the cultivator bars, hand levers pivotally connected to the frame and engaging the said brackets, said levers having rearwardly projecting handles, and controlling members also in pivotal connection with the frame and in movable connection with the said cultivator heads, said last named levers having rearwardly projecting treadles below the handles of the first named levers.

5. A cultivator of the type described including a wheeled frame, a rear axle upon which the rear wheels are mounted, cultivator implements, vertically shiftable cultivator heads in connection with which said implements are mounted, and supports for the said heads including pendent members on which the heads are movable, and brackets supporting said pendent members and shiftable toward and away from one another on the said axle.

6. A cultivator of the type described including a wheeled frame, a rear axle upon which the rear wheels are mounted, cultivator implements, vertically shiftable cultivator heads in connection with which said implements are mounted, and supports for the said heads including pendent members on which the heads are movable, and brackets supporting said pendent members and shiftable toward and away from one another on the said axle, hand operated means for controlling the laterally adjustable brackets, and foot operated means for controlling the said cultivator heads.

7. In a cultivator of the character described, rear laterally adjustable hand controlled supporting brackets, cultivator bars pendent from the said brackets, cultivator implements, and vertically adjustable foot controlled cultivator heads carrying said implements and movably disposed on the said cultivator bars.

8. In a cultivator of the character described, rear laterally adjustable hand controlled supporting brackets, cultivator bars pendent from the said brackets, cultivator implements, and vertically adjustable foot controlled cultivator heads carrying said implements and movably disposed on the said cultivator bars, said cultivator bars being pivotally connected at their upper ends to the said supports and having means yieldingly holding the same against rearward swinging movement on their said pivots.

MANLEY S. SULLIVAN.